US012591770B2

(12) United States Patent
Look et al.

(10) Patent No.: US 12,591,770 B2
(45) Date of Patent: Mar. 31, 2026

(54) PREDICTING A STATE OF A COMPUTER-CONTROLLED ENTITY

(71) Applicant: Robert Bosch GmbH, Stuttgart (DE)

(72) Inventors: Andreas Look, Stuttgart (DE); Chen Qiu, Sindelfingen (DE); Melih Kandemir, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1039 days.

(21) Appl. No.: 17/231,757

(22) Filed: Apr. 15, 2021

(65) Prior Publication Data

US 2021/0350231 A1 Nov. 11, 2021

(30) Foreign Application Priority Data

May 6, 2020 (EP) ..................................... 20173104

(51) Int. Cl.
*G06N 3/08* (2023.01)
*G06N 3/045* (2023.01)

(52) U.S. Cl.
CPC ............... *G06N 3/08* (2013.01); *G06N 3/045* (2023.01)

(58) Field of Classification Search
CPC ............ G06N 3/08; G06N 3/02; G06N 3/045; G06N 3/04

(Continued)

(56) References Cited

U.S. PATENT DOCUMENTS 10,829,149 B1 * 11/2020 Garimella .............. B62D 6/001
11,878,733 B2 * 1/2024 Nakano ................ B62D 7/1509

(Continued)

FOREIGN PATENT DOCUMENTS

| CN | 109615860 A | 4/2019 |
| CN | 109902801 A | 6/2019 |

(Continued)

OTHER PUBLICATIONS

Kutschireiter et al., "Nonlinear Bayesian filtering and learning: a neuronal dynamics for perception", Scientific Reports, 7: 8722, Aug. 18, 2017. (Year: 2017).*
Hegde et al., "Deep learning with differential Gaussian process flows", arXiv: 1810.04066, Oct. 15, 2018. (Year: 2018).*

(Continued)

*Primary Examiner* — Hwei-Min Lu
(74) *Attorney, Agent, or Firm* — NORTON ROSE FULBRIGHT US LLP

(57) ABSTRACT

A computer-implemented method for enabling control or monitoring of a computer-controlled entity operating in an environment by predicting a future state of the computer-controlled entity and/or its environment using sensor data which is indicative of a current state of the computer-controlled entity and/or its environment. The method includes using a first neural network for approximating a drift component of a stochastic differential equation and a second neural network for approximating a diffusion component of the stochastic differential equation, and discretizing the stochastic differential equation into time steps, and obtaining time-evolving mean and covariance functions based on the discretization and determining a probability distribution of a second state of the computer-controlled entity and/or its environment therefrom. The control of the computer-controlled entity may thus be enhanced and made more efficient and reliable using the uncertainty information available from the determined probability distribution.

14 Claims, 6 Drawing Sheets

(58) Field of Classification Search
USPC .............................................. 706/21, 16, 15
See application file for complete search history.

(56) References Cited

U.S. PATENT DOCUMENTS

| | | | | |
|---|---|---|---|---|
| 2007/0022068 | A1* | 1/2007 | Linsker ................ | G05B 13/026 |
| | | | | 706/23 |
| 2015/0032258 | A1* | 1/2015 | Passot .................. | G05D 1/0016 |
| | | | | 700/250 |
| 2016/0096272 | A1* | 4/2016 | Smith ................... | B25J 9/1697 |
| | | | | 700/255 |
| 2018/0336579 | A1* | 11/2018 | Gauthier ............ | G06Q 30/0202 |
| 2019/0332918 | A1* | 10/2019 | Gómez Gutiérrez .... | G06N 3/09 |
| 2020/0225673 | A1* | 7/2020 | Ebrahimi Afrouzi ........................ | |
| | | | | A47L 11/4011 |
| 2021/0165409 | A1* | 6/2021 | Berntorp .............. | G05D 1/0214 |
| 2021/0221386 | A1* | 7/2021 | Quirynen ............ | B60W 60/001 |
| 2022/0066456 | A1* | 3/2022 | Ebrahimi Afrouzi ........................ | |
| | | | | G06F 3/04883 |
| 2022/0366284 | A1* | 11/2022 | Adam .................... | G06N 20/00 |

FOREIGN PATENT DOCUMENTS

| | | |
|---|---|---|
| CN | 110582784 A | 12/2019 |
| CN | 110651279 A | 1/2020 |
| CN | 111008689 A | 4/2020 |
| CN | 111027680 A | 4/2020 |
| WO | 2018013247 A2 | 1/2018 |

OTHER PUBLICATIONS

Chen, et al., "DynaNet: Neural Kalman Dynamical Model for Motion Estimation and Prediction", arXiv: 1908.03918, Aug. 11, 2019. ( Year: 2019).*
Look et al., "Differential Bayesian Neural Nets", 4th workshop on Bayesian Deep Learning (NeurIPS 2019), Vancouver, Canada, Dec. 2, 2019. (Year: 2019).*
Uy et al., "Time evolution of the characteristic and probability density function of diffusion processes via neural networks", arXiv: 2001.05437, Jan. 15, 2020. (Year: 2020).*
Look et al., "Differential Bayesian Neural Nets", 4th workshop on Bayesian Deep Learning (NeurIPS 2019), Vancouver, Canada, arXiv ID: 1912.00796, Dec. 2, 2019, pp. 1-4.. (Year: 2019).*
Haykin et al., "Optimum nonlinear filtering", IEEE Transactions on Signal Processing, vol. 45, No. 11, Nov. 1997, pp. 2774-2786. (Year: 1997).*
Simonsen et al., "A Simple Stochastic Differential Equation with Discontinuous Drift", EPTCS 124, 2013, pp. 109-123. (Year: 2013).*
Stager et al., "Stochastic behavior of robots that navigate by interacting with their environment", 2016 IEEE 55th Conference on Decision and Control (CDC), Dec. 2016, pp. 6871-6876. (Year: 2016).*
García et al., "Non-parametric Estimation of Stochastic Differential Equations with Sparse Gaussian Processes", Phys. Rev. E 96, 022104 (2017), arXiv ID: 1704.04375, Apr. 14, 2017, pp. 1-13. (Year: 2017).*
Rano et al., "Adrift diffusion model of biological source seeking for mobile robots", 2017 IEEE International Conference on Robotics and Automation (ICRA), May 2017, pp. 3525-3531. (Year: 2017).*
Kutschireiter et al., "Nonlinear Bayesian filtering and learning: a neuronal dynamics for perception", Scientific Reports, 7: 8722, Aug. 18, 2017, pp. 1-13. (Year: 2017).*
Ryder, et al., "Black-box Variational Inference for Stochastic Differential Equations", arXiv: 1802.03335, Feb. 9, 2018. (Year: 2018).*
Hegde et al., "Deep learning with differential Gaussian process flows", arXiv: 1810.04066, Oct. 9, 2018, pp. 1-15. (Year: 2018).*
Hegde et al., "Deep learning with differential Gaussian process flows", arXiv: 1810.04066, Oct. 15, 2018, pp. 1-15. (Year: 2018).*
Pereira et al., "Neural Network Architectures for Stochastic Control using the Nonlinear Feynman-Kac Lemma", arXiv: 1902.03986. Feb. 11, 2019. (Year: 2019).*
Särkkä et al., "Applied Stochastic Differential Equations", Cambridge University Press, May 3, 2019. (Year: 2019).*
Do Nascimento et al., "Perception-Driven Motion Control Based on Stochastic Nonlinear Model Predictive Controllers", IEEE/ASME Transactions on Mechatronics, vol. 24, No. 4, Aug. 2019, pp. 1751-1762. (Year: 2019).*
Chen, et al., "DynaNet: Neural Kalman Dynamical Model for Motion Estimation and Prediction", arXiv: 1908.03918, Aug. 11, 2019, pp. 1-12. (Year: 2019).*
Fan et al., "Bayesian Learning-Based Adaptive Control for Safety Critical Systems", arXiv: 1910.02325, Oct. 5, 2019. (Year: 2019).*
Look et al., "Differential Bayesian Neural Nets", 4th workshop on Bayesian Deep Learning (NeurIPS 2019), Vancouver, Canada, Dec. 2, 2019, pp. 1-4. (Year: 2019).*
Uy et al., "Time evolution of the characteristic and probability density function of diffusion processes via neural networks", arXiv: 2001.05437, Jan. 15, 2020, pp. 1-32. (Year: 2020).*
M. P. Deisenroth et al., "PILCO: A Model-Based and Data-Efficient Approach to Policy Search," Proceedings of the 28th International Conference on Machine Learning, 2011, pp. 1-8. <http://mlg.eng.cam.ac.uk/pub/pdf/DeiRas11.pdf> Downloaded Apr. 14, 2021.
Simon J.A. Malham et al., "An Introduction To Sde Simulation," Cornell University, 2010, pp. 1-27.
Philipp Batz et al., "Approximate Bayes Learning of Stochastic Differential Equations," Cornell University, 2017, pp. 1-18.

* cited by examiner

600 approximate probability distribution at state N 660 estimate mean of state N+1 670 estimate covariance of state N+1 680 calculate transition probability distribution 690 determine probability of measured state N+1 695 obtain observations 610 obtain discretization 620 obtain mean function and covariance function 630 obtain neural networks 640 determine optimized weights 650

PREDICTING A STATE OF A COMPUTER-CONTROLLED ENTITY

CROSS REFERENCE

The present application claims the benefit under 35 U.S.C. § 119 of European Patent Application No. EP 20173104.9 filed on May 6, 2020, which is expressly incorporated herein by reference in its entirety.

FIELD

The present invention relates to a computer-implemented method for enabling control or monitoring of a computer-controlled entity by predicting a future state of the computer-controlled entity or its environment. The present invention further relates to a method for training a prediction system, to a prediction system for enabling control or monitoring of a computer-controlled entity, to a training system for training a prediction system, and to a transitory or non-transitory computer-readable medium.

BACKGROUND INFORMATION

Computer-controlled entities are commonly controlled based on their current state, which is often determined from sensor data. Increasingly, the state of the computer-controlled entity may be predicted through the use of trained, or machine learned, models. A common example of such a model is one in which the movement of an autonomous agent, such as a robot, car or drone, is predicted based on the current position, for example based on Global Positioning System (GPS) data or the like. Such computer-controlled entities as the autonomous agent are typically coupled to, or include, at least one sensor, used to collect data from which the current state may be inferred, and at least one actuator which may be used to perform actions that affect the computer-controlled entity and/or its environment. The current state may be a physical state, such as a vehicle speed, or a combination of a physical state and an internal state, such as a parameter representing a remaining range of the vehicle, for example.

An autonomous vehicle is an example of a computer-controlled entity, in which the movement control of the autonomous vehicle is often affected by the trajectories of other road traffic, such as pedestrians, bicycles and other vehicles, to avoid collisions. The trajectories of the other road traffic are typically predicted based on their current location (for example, relative to the autonomous vehicle), trajectory, angle, velocity and the like. Information on other road users or road traffic is commonly obtained from sensor data. In such an example, the relative position of the autonomous vehicle with respect to other road traffic is an example of a state of the computer-controlled entity (e.g., the autonomous vehicle). In other words, the autonomous vehicle infers how various aspects of its environment evolve, such as the movements of other vehicles, pedestrians etc., and adjusts its behavior and/or movement accordingly. Specifically, the steering and/or braking of the autonomous vehicle may be controlled based on an inferred position of the autonomous vehicle relative to the other road traffic. A further example is that of a computer-controlled combustion engine within a vehicle, in which the operation of the combustion engine is based on a state of the engine inferred from sensor data, such as engine temperature and/or pressure sensors.

Another example of a computer-controlled entity is a heating system, such as a heating system in a building. The building may be considered the environment of the heating system. Heating systems may be used to control the temperature within the building. In such cases, the heating system may be an example of the computer-controlled entity operating in the environment (e.g., the building) and the temperature within the building (e.g., the interior temperature) may be considered a state of the environment of the computer-controlled entity. In such an example, the interior temperature to be achieved by the heating system may be based on the sensor data indicating the outside temperature. Further examples of entities or systems that can be computer-controlled are vehicles and components thereof, domestic appliances, power tools, manufacturing machines, personal assistants, access control systems, drones, nanorobots, and heating control systems.

The control of the computer-controlled entity in the above examples is often based on a prediction of the next state(s) of the computer-controlled entity and/or its environment. It is therefore advantageous to provide an accurate state prediction quickly, in order for the computer-controlled entity and/or its environment to adapt in a timely manner. Typically, the next state of the computer-controlled entity and/or its environment is the state that will occur at the next time step. Especially in the case of autonomous vehicles, time steps may be very short, in other words, there is a high level of adaptability required, in relatively small time intervals, and ideally in real-time. Moreover, it is important to have an indication of the prediction uncertainty, as the uncertainty of a prediction may, in many cases, affect how the computer-controlled entity is controlled. For example, a prediction with a low uncertainty may be used to quickly change some aspect of the computer-controlled entity, whereas a prediction with high uncertainty may instead benefit from increased monitoring, for example.

A machine-learned model may be used to make state predictions of one or more future states of the computer-controlled entity and/or its environment. The behavior or action(s) of the computer-controlled entity may be adapted or triggered based on the predicted state(s). For example, the autonomous car may swerve to avoid an obstacle, such as a pedestrian, when the autonomous vehicle is inferred to be on a collision course. As a further example, the control of a robot arm may be based on predictions of the effect of changing the angles of joints thereof.

Typically, state predictions are based on a physical model, or an approximation thereof. However, many interactions between computer-controlled entities and their environment are governed by physical laws and processes that are too complicated to model using current approximations. For example, many physical processes are stochastic in nature, meaning they have an element of randomness, which makes any state prediction invariably difficult and prone to inaccuracy. Stochastic differential equations may be used to represent such complex physical processes, but are typically difficult to model.

A stochastic differential equation (SDE) comprises a drift component and a diffusion component. The drift component is deterministic, meaning a particular input will always generate the same output. This makes the drift component relatively straightforward to understand and model. The diffusion component, however, is stochastic, and includes a random element, meaning that a particular input will produce different outputs. Existing methods for modelling SDEs involve approximating the SDE by linear dynamics minimizing the variational free energy, or by approximating the Fokker Planck Kolmogorov equation, which is not solvable without high cost or error. Moreover, the existing methods are not numerically stable and the training of such models is particularly unstable due to the noise injected by the randomness element, and they do not provide efficient access to prediction uncertainties. The lack of accurate prediction uncertainties can cause poor control of the computer-controlled entity and lead to undesired control decisions being made.

In the paper entitled "PILCO: A Model-Based and Data-Efficient Approach to Policy Search" by MP Deisenroth and CE Rasmussen (available at mlg.eng.cam.ac.uk/pub/pdf/DeiRas11.pdf and incorporated herein by reference), a practical, data-efficient model-based policy search method is described. Non-parametric probabilistic Gaussian processes are used in the method therein in order to express model uncertainty. However, the method of this paper is restricted to radial basis function (RBF) controllers and cannot incorporate prior knowledge of the physical process.

SUMMARY

It may be desirable to enable control or monitoring of a computer-controlled entity based on a predicted state of the computer-controlled entity and/or its environment, in which the stability is improved and the uncertainty of the prediction is efficiently provided.

In accordance with the first aspect of the present invention, a computer-implemented method and corresponding prediction system for enabling control or monitoring of a computer-controlled entity operating in an environment by predicting a future state of the computer-controlled entity and/or its environment are provided. In accordance with an aspect of the present invention, a computer-implemented method and corresponding training system for training a machine-learnable model for use in controlling or monitoring a computer-controlled entity, wherein the model is trained to predict a future state of the computer-controlled entity and/or its environment are provided. In accordance with another aspect of the present invention, a computer-readable medium is provided.

Various aspects of the present invention relate to the training and use of a prediction system for enabling control or monitoring of a computer-controlled entity operating in an environment by predicting a future state of the computer-controlled entity and/or its environment. A process which is associated with the computer-controlled entity and/or its environment, such as a physical process representing an interaction therebetween, may be modelled using a stochastic differential equation (SDE). A current state of a computer-controlled entity and/or its environment may be inferred from sensor data which may be obtained from one or more sensors. In accordance with an example embodiment of the present invention, a method for predicting a second state based on the current state comprises receiving said sensor data, providing a first trained neural network for approximating a drift component of the SDE and a second trained neural network for approximating a diffusion component of the SDE. The method further comprises discretizing the stochastic differential equation into time steps. Based on the discretization and the assumption that at any time step, the state of the computer-controlled entity and/or its environment may be modelled as a normal distribution, a time-evolving mean function and a time-evolving covariance function may be determined. The time-evolving mean function may provide an estimation for a mean of the second state (e.g., the state at a next time step) and the time-evolving covariance function may provide an estimation of the covariance of the second state. Based on the mean and covariance of a current state, the mean and covariance of the second state may be calculated, defining a transition probability distribution for the second state. The determined transition probability distribution can then be used to provide a prediction of the second state, as well as an accurate indication of the uncertainty of said prediction.

In accordance with an example embodiment of the present invention, the training method comprises obtaining a set of observations, each observation of which comprises a time step and a variable indicating a state of the computer-controlled entity and/or its environment at said time step. The training method further comprises obtaining a set of weights for the neural networks and determining an optimal set of weights therefrom using maximum likelihood estimation to maximize the probability of the observations given the weights.

The neural networks used herein are used in their capacity as universal function approximators. The set of observations enables the weights of the neural networks to be calculated through a maximum likelihood estimation. The observations need not be equally spaced, and the method can be directly applied to arbitrarily-spaced observations, making the training method suitable in applications where measurements are not uniformly periodic. This training method also enables the possibility of conditioning a whole sequence based on a single observation. For example, the training method may, for a single observation, obtain a predicted mean and a predicted covariance for a subsequent state, and then use the predicted mean and the predicted covariance to predict the next subsequent state, and so on.

Current machine-learning systems based on SDEs suffer from several disadvantages. Training the systems is inherently unstable. Learning dynamics with neural networks generally involves admitting recurrence of instances, which is known to excite training instability even for deterministic model families such as recurrent neural networks. Noise injected as Brownian diffusion, recurrence in the neural network governing the diffusion, and inaccurate discretization add multiple major factors to induce instability to neural SDE training. The effect of this instability is visible especially in backpropagating error from long roll-out sequences. Additionally, current methods do not provide an accurate indication of prediction uncertainty.

The measures described herein address the above disadvantages. The use of SDEs for state predictions enable the provision of uncertainty estimates of the given predictions. In comparison, ordinary differential equations (ODEs) do not provide these uncertainties. The use of uncertainties is important in many applications, including robotics, where it can be used to maintain a safety margin when steering or controlling a robot, for example. The use of an uncertainty indication when controlling an entity may prevent undesired behavior and can impact how the entity is controlled. For example, a prediction with a high uncertainty may result in different behavior or control adaptation than the same prediction with a low uncertainty. Moreover, the measures described herein provide a generic solution for predicting states for myriad applications, making deployment simpler and increasing adaptability. Additionally, the measures described herein do not require sampling in order to obtain a suitable discretization. Furthermore, the measures described herein provide improved training stability.

Current methods that attempt to approximate processes modelled by SDEs typically involve discretizing the SDE by drawing samples. However, dependency on samples causes a significant computation overhead when a downstream application requires quantification of the uncertainty of predicted trajectories.

Discretizing the SDE according to the measures described herein involves discretizing the SDE into time steps, wherein the discretized SDE defines the second state as being dependent on the current state and a time interval between the time of the current state and the time of the second state. For example, the SDE may be discretized using the Euler-Maruyama discretization scheme or a Milstein discretization. Based on the discretization the noise process is first integrated out analytically. Afterwards a time-evolving mean function may be determined, for example through linearization or through the use of a cubature approximation. A time-evolving covariance function may similarly be derived from the discretization, for example by using a cubature approximation. The time-evolving mean function may provide an estimation for a mean of the next state (e.g., the state at a next time step) of the computer-controlled entity and/or its environment based on an input of the mean at a current time step. Similarly, the time-evolving covariance function may provide an estimation of the covariance of the next state based on an input of a current covariance and the estimated mean of the next state. By discretizing the SDE and applying the aforementioned approximations to the mean and covariance functions, the noise variable may be decoupled, thus simplifying these functions. The mean and covariance functions may thus be a coupled set of equations.

The current state of the computer-controlled entity may be determined based on sensor data which represents sensor measurements associated with the state of the computer-controlled entity. The computer-controlled entity may for example be a physical entity such as a vehicle, robot, etc., or a connected or distributed system of physical entities, e.g., a lighting system, or any other type of physical system, such as a building. The state may be time-varying quantity, e.g., a temperature, a speed, an acceleration, a position, a geolocation, an occupancy, etc., but also a set of such quantities, e.g., a vector of speed and acceleration.

The state may be inferred from sensor data which may be obtained from one or more sensors. The sensor(s) may be part of the computer-controlled entity so as to be able to obtain sensor measurements which are associated with the state of the computer-controlled entity, or may be arranged separate from the computer-controlled entity if the sensor measurements may be obtained remotely. The sensor measurements pertain to quantities that allow the state to be inferred from the sensor measurements. As such, there exists a correlation between the measured quantity(s) and the quantity(s) representing the state to be inferred. Typically, the quantity representing the state to be inferred cannot be measured directly, e.g., for fundamental or practical reasons.

Optionally, in accordance with an example embodiment of the present invention, the discretization of the stochastic differential equation is an Euler-Maruyama discretization. The Euler-Maruyama discretization is a straightforward discretization scheme, providing a simplified implementation and reducing overhead.

Optionally, in accordance with an example embodiment of the present invention, estimating the mean for the second state comprises one of expanding the time-evolving mean function using a linear expansion such as a first-order Taylor expansion, and using a cubature approximation.

Optionally, in accordance with an example embodiment of the present invention, estimating the covariance for the second state comprises using a cubature approximation.

Using such approximations enables a straightforward calculation of the mean and covariance for the next state of the computer-controlled entity and/or its environment.

Optionally, in accordance with an example embodiment of the present invention, the method further comprises sampling from the determined probability distribution to obtain a prediction for the second state.

Optionally, in accordance with an example embodiment of the present invention, the method further comprises outputting the mean of the determined probability distribution as a prediction and outputting the covariance of the determined probability distribution as a confidence value for said prediction. The covariance provides an estimate of the spread of the data. For example, a high covariance implies a large spread, meaning a high uncertainty. The off-diagonal values of the covariance provide information on the direction of the spread.

Sampling from the determined probability distribution provides a prediction for the next state which also provides an estimation of the uncertainty of the prediction. Having a high-quality precision estimate of uncertainty can be greatly advantageous in many applications, including autonomous vehicles and robotics.

Optionally, in accordance with an example embodiment of the present invention, the method further comprises generating control data for an actuator. Based on the predicted state of the computer-controlled entity and/or its environment, data for controlling the computer-controlled entity may be generated. The control data may be used to control an actuator which adjusts or controls the computer-controlled entity or an aspect in its environment. For example, the steering or braking of an autonomous vehicle, or in robotics, to change a position of a robot arm, for example.

Optionally, in accordance with an example embodiment of the present invention, the current mean is initialized as a measurement value of the current state and the current covariance is initialized as the identity matrix scaled by an arbitrarily small positive value. These choices may provide a convenient and straightforward starting point for basing future predictions.

Optionally, in accordance with an example embodiment of the present invention, the method further comprises sequentially approximating at least one further state of the computer-controlled entity and/or its environment based on a prediction of an immediately preceding state, by iteratively: selecting a new state $x(i)$ of the at least one further state to be the state immediately following the last predicted state $x(i-1)$, estimating a mean for the new state $x(i)$ by using the mean determined for the last predicted state $x(i-1)$, estimating a covariance for the new state $x(i)$ sing the estimated mean for the new state $x(i)$ and the covariance determined for the last predicted state $x(i-1)$, and determining the probability distribution of the new state $x(i)$ using the estimated mean of the new state $x(i)$ and the estimated covariance of the new state $x(i)$.

This provides the advantage of predicting multiple future states, still with an accurate indication of the uncertainty thereof. Predicting multiple future states in this manner is particularly advantageous in applications whose states change quickly. Control data for the computer-controlled entity and/or an actuator thereof may therefore be determined and generated more efficiently, resulting in a more efficient control of the computer-controlled entity. Moreover, the uncertainties of all such predicted states may be easily and efficiently obtained, also improving decision making and control of the computer-controlled entity.

It will be appreciated by those skilled in the art that two or more of the above-mentioned embodiments, implementations, and/or optional aspects of the present invention may be combined in any way deemed useful.

Modifications and variations of the computer-implemented method or any computer-readable medium, which correspond to the described modifications and variations of the system, can be carried out by a person skilled in the art on the basis of the present description, and vice versa.

BRIEF DESCRIPTION OF THE DRAWINGS

These and other aspects of the present invention are apparent from and will be elucidated with reference to the embodiments described hereinafter.

It should be noted that the figures are purely diagrammatic and not drawn to scale. In the figures, elements which correspond to elements already described may have the same reference numerals.

DETAILED DESCRIPTION OF EXAMPLE EMBODIMENTS

The following relates to a prediction system and corresponding computer-implemented method for enabling control or monitoring of a computer-controlled entity based on a state of the computer-controlled entity which is inferred from sensor data, as well as a training system and corresponding computer-implemented invention for training a machine learnable model. The training system and the prediction system are described with reference to FIGS. 1 and 2, respectively, while the computer-implemented prediction method is described in detail with reference to FIGS. 3 and 5, and the computer-implemented training method is described in detail with reference to FIGS. 4 and 6.

Figure 1:
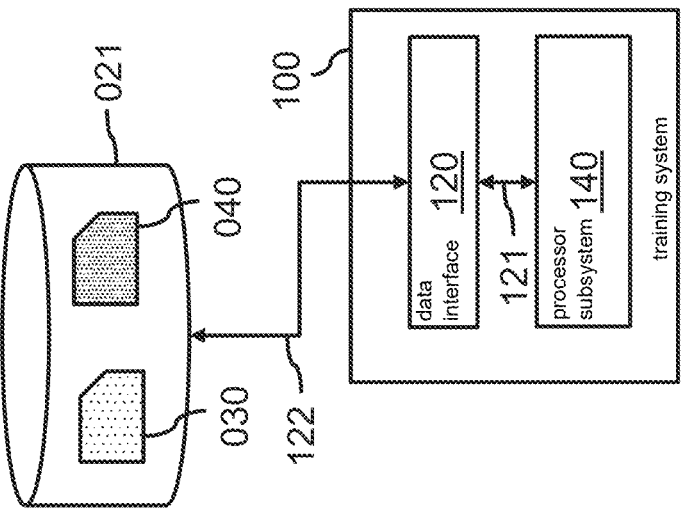
FIG. 1 shows a system for training a model for making state predictions of a computer-controlled entity and/or its environment according to an example embodiment of the present invention.

FIG. 1 shows a training system 100 for training a machine-learnable model for making state predictions of a computer-controlled entity and/or its environment according to an embodiment of the present invention. The model may use a stochastic differential equation (SDE) comprising a drift component and a diffusion component. The model may comprise a first neural network for modelling the drift component and a second neural network for modelling the diffusion component.

The training system 100 may comprise a data interface 120 and a processor subsystem 140 which may be configured to communicate internally via data communication 121. The data interface 120 may enable access of model data 040 defining the model. The model data may comprise at least a set of parameters, such as weights of the first neural network and weights of the second neural network. The data interface 120 may further be used to enable access of a set of observations 030 of the computer-controlled entity and/or its environment. The model data 040 may be for use in making state predictions of the computer-controlled entity and/or its environment according to a method described herein, such as by the prediction system 200 of FIG. 2.

The processor subsystem 140 may be configured to, during operation of the training system 100 and using the data interface 120, access data 030, 040. For example, as shown in FIG. 1, the data interface 120 may provide access 122 to an external data storage 021 which may comprise said data 030, 040. Alternatively, the data 030, 040 may be accessed from an internal data storage which is part of the training system 100. Alternatively, the data 030, 040 may be received via a network from another entity. In general, the data interface 120 may take various forms, such as a network interface to a local or wide area network, e.g., the Internet, a storage interface to an internal or external data storage, etc. The data storage 021 may take any conventional and suitable form.

The processor subsystem 140 may obtain a set 030 of observations of the computer-controlled entity and/or its environment. An observation may comprise a measurement, or series of measurements, of the computer-controlled entity at a time step. The set of observations may therefore provide one or more measurements for each of a plurality of time steps, such as a time series. In the figure, the observations are accessed via data interface 120, but this is not needed, e.g., observations may be measured during training.

The processor subsystem 140 may train the model based on the set 030 of observations. The model may comprise two neural networks—a first neural network corresponding to the drift component and a second neural network corresponding to the diffusion component. In order to train the model, the processor subsystem 140 may determine weights of the respective neural networks, for example by using a maximum likelihood estimation (MLE). To train the model, processor subsystem 140 may initialize the weights of the neural networks, or use an initialized set of weights which may be provided, for example. The processor subsystem 140 may then select an observation from the set of observations and may further determine a state prediction of the computer-controlled entity corresponding to the selected observation. Using MLE, the processor subsystem 140 may optimize the weights of the neural networks.

As an optional component, the training system 100 may comprise a sensor interface (not shown) for obtaining, from one or more sensors, sensor data of the computer-controlled entity. Based on this sensor data, a measurement corresponding to the state of the computer-controlled entity may be determined for use as an observation in training the model. For example, the measurement may comprise or be based on one or more sensor readings. Sensor interfaces are also described with respect to FIG. 2.

Figure 3:
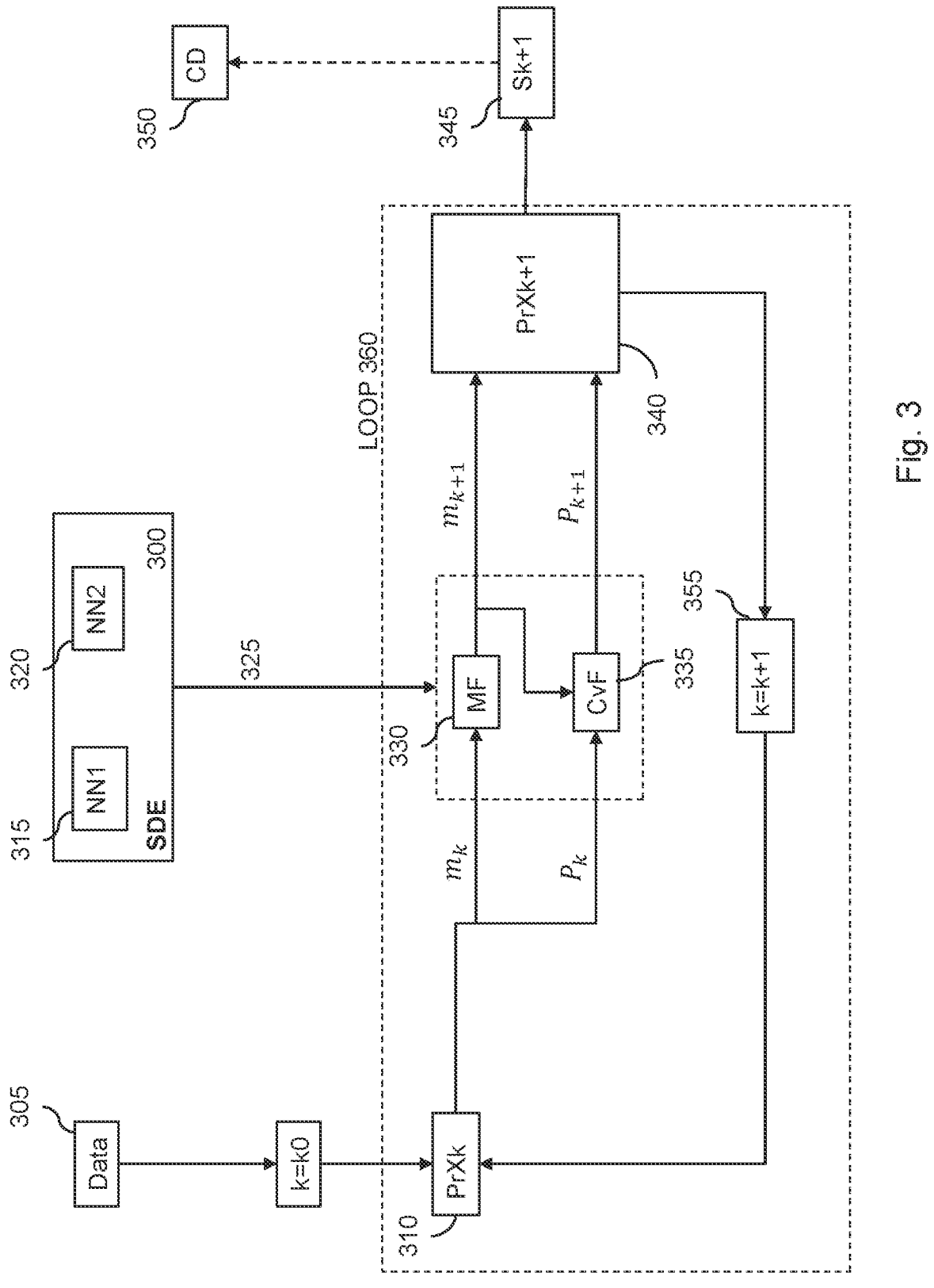
FIG. 3 shows a detailed example of a trained model for making state predictions of a computer-controlled entity and/or its environment according to an example embodiment of the present invention.
Figure 4:
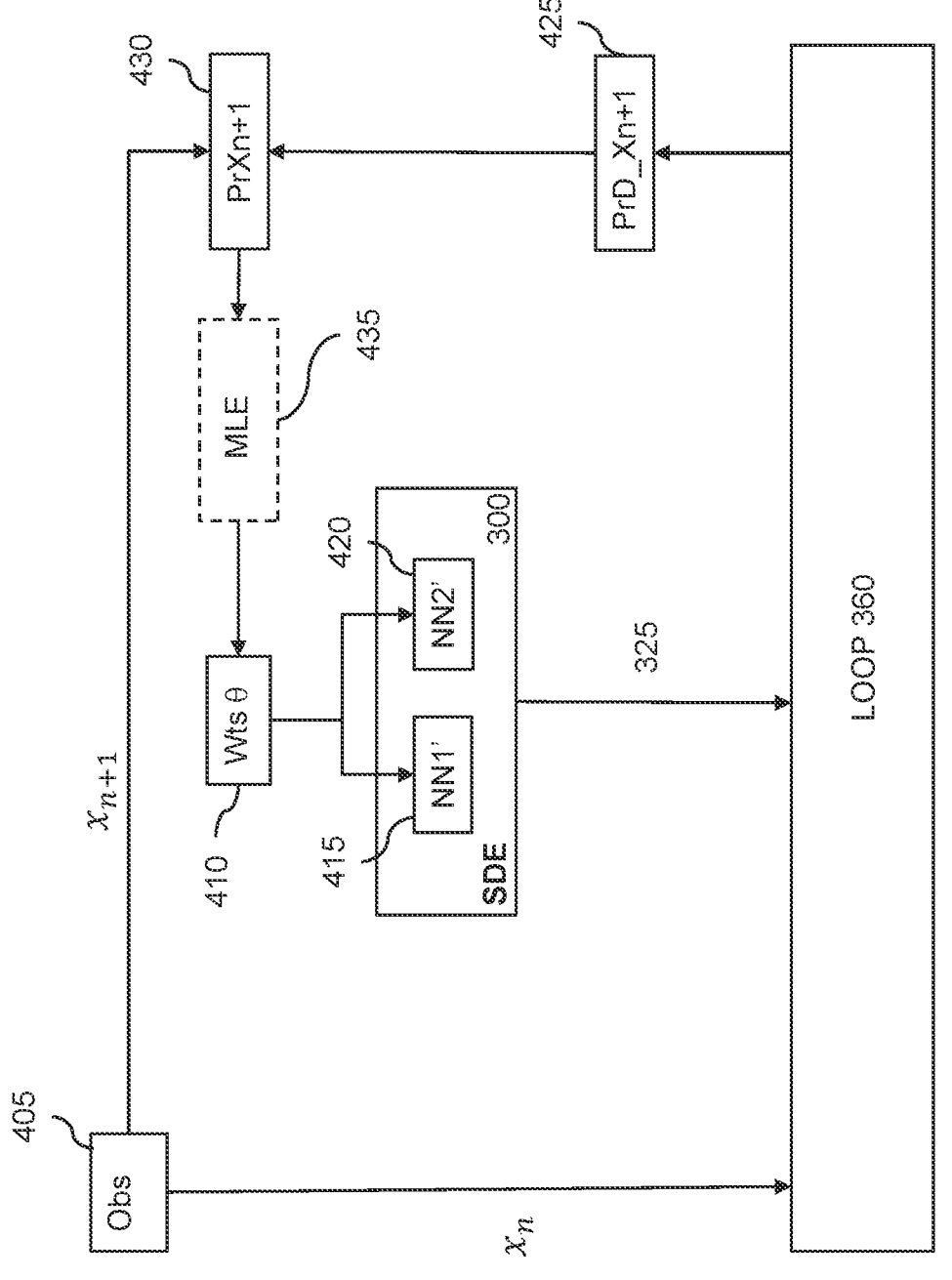
FIG. 4 shows a detailed example of training a machine learnable model based on observations according to an example embodiment of the present invention.

Various details and aspects of the operation of the training system 100 will be further elucidated with reference to FIGS. 3-4, including optional aspects thereof. In particular, the method of training the model will be described in more detail with reference to FIG. 4

In general, the training system 100 may be embodied as, or in, a single device or apparatus, such as a workstation, e.g., laptop or desktop-based, or a server. The device or apparatus may comprise one or more microprocessors which execute appropriate software. For example, the processor subsystem may be embodied by a single Central Processing Unit (CPU), but also by a combination or system of such CPUs and/or other types of processing units. The software may have been downloaded and/or stored in a corresponding memory, e.g., a volatile memory such as RAM or a non-volatile memory such as Flash. Alternatively, the functional units of the system, e.g., the data interface and the processor subsystem, may be implemented in the device or apparatus in the form of programmable logic, e.g., as a Field-Programmable Gate Array (FPGA) and/or a Graphics Processing Unit (GPU). In general, each functional unit of the training system 100 may be implemented in the form of a circuit. It is noted that the training system 100 may also be implemented in a distributed manner, e.g., involving different devices or apparatuses, such as distributed servers, e.g., in the form of cloud computing.

Figure 2:
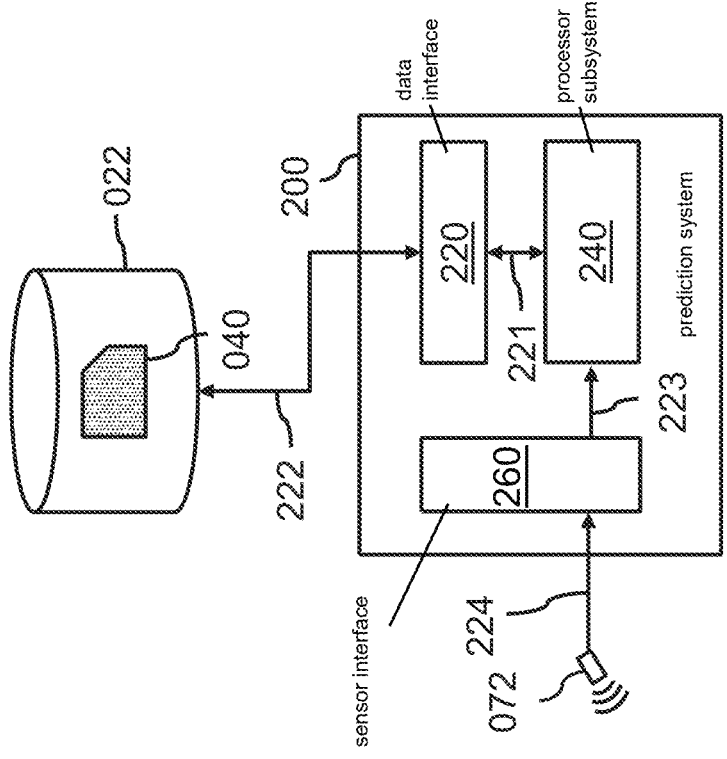
FIG. 2 shows a system for using a trained model to make a state prediction of a computer-controlled entity and/or its environment according to an example embodiment of the present invention.

FIG. 2 shows a prediction system 200 for using a trained model to make a state prediction of a computer-controlled entity. The model may use a stochastic differential equation comprising a drift component and a diffusion component.

The prediction system 200 may comprise a data interface 220 and a processor subsystem 240 which may be configured to internally communicate via data communication 221. Data interface 220 may be for accessing model data 040 defining the model. The model data may comprise at least a set of parameters (e.g., weights) of the first and second neural networks. The model may be trained according to a training method as described herein, e.g., by training system 100 of FIG. 1. The prediction system 200 may also be configured to train the model in addition to applying it, e.g., prediction system 200 may be combined with training system 100 of FIG. 1.

The processor subsystem 240 may be configured to, during operation of the system 200 and using the data interface 220, access data 040. For example, as shown in FIG. 2, the data interface 220 may provide access 222 to an external data storage 022 which may comprise said data 040. Alternatively, the data 040 may be accessed from an internal data storage which is part of the prediction system 200. Alternatively, the data 040 may be received via a network from another entity. In general, the data interface 220 may take various forms, such as a network interface to a local or wide area network, e.g., the Internet, a storage interface to an internal or external data storage, etc. The data storage 022 may take any conventional and suitable form.

The processor subsystem 240 may be configured to, during operation of the prediction system 200 and using the data interface 220, obtain the trained model and data, such as sensor data, used to determine a current state of the computer-controlled entity and/or its environment. The trained model may use an SDE comprising a drift component and a diffusion component, in which a first neural network is used to provide the drift component and a second neural network is used to provide the diffusion component.

The SDE can generally be expressed as follows:

$$dX = f(x,t)dt + L(x,t)dW \qquad \text{(Equation 1)}$$

in which f(•) denotes the drift component and L(•) denotes the diffusion component, where W(t) denotes a stochastic process, such as a Wiener process or a process based on Brownian motion.

As neural networks may be used as universal function approximators, the first neural network is provided for the function f(•) and the second neural network is provided for the function L(•).

The processor subsystem 240 may be configured to discretize the SDE, which provides an expression for a next state $(x_{k+1})$ of the computer-controlled entity and/or its environment based on the current state. The discretization, and indeed all aspects of this method, will be elucidated with reference to FIG. 3. The processor subsystem 240 may then assume that, at any time step, the transition probability of the computer-controlled entity and/or its environment is approximately Gaussian. Thus, the mean and the covariance thereof may be approximated, for example using a linearization and/or a cubature approximation. Again, the determination of the mean and covariance will be discussed in detail with reference to FIG. 3. Based on the mean and covariance of the present state of the computer-controlled entity and/or its environment, the mean and covariance of the next state may be calculated. The mean and covariance of the next state define a normal distribution from which a prediction for the next state may be sampled. The covariance further provides an accurate estimation of the uncertainty of the prediction.

As an optional component, the prediction system 200 may comprise a sensor interface 260 for obtaining, from one or more sensors, sensor data 224 indicative of a state of the computer-controlled entity. As a non-limiting example, a single sensor 072 is shown in the figure. Sensor interface 260 may internally communicate with processor subsystem 240 via data communication 223. Generally, the sensor data 224 may comprise measurements of one or more physical quantities of the computer-controlled entity and/or its environment, e.g., of a device being controlled and/or an environment with which the device interacts. Based on these measurements, a measurement of the computer-controlled entity and/or its environment in terms of a set of observation variables of the model may be determined (e.g., by including direct measurements of sensor data 224 or by computing indirect measurements based on sensor data 224), from which initial values, such as of the mean and covariance, may be derived. Alternatively, the initial values of the mean and covariance may be derived from, or correspond to, the sensor data 224.

The sensor interface 260 may be configured for various types of sensor signals, e.g., measurements of various physical quantities such as temperature, pressure, light intensity, motion, acceleration, and various signals based on which such various physical quantities may be determined, e.g., video signals, radar/LiDAR signals, ultrasonic signals, etc. The sensor(s) 072 can be arranged in the computer-controlled entity, but remote sensing is also possible. Sensor interface 260 may also access the sensor data from elsewhere, e.g., from a data storage or a network location. Sensor interface 260 may have any suitable form, including but not limited to a low-level communication interface, e.g., based on I2C or SPI data communication, but also a data storage interface such as a memory interface or a persistent storage interface, or a personal, local or wide area network interface such as a BLUETOOTH® interface, a ZIGBEE® interface, or a Wi-Fi® interface or an ethernet or fiberoptic interface. Sensor 072 may be included in prediction system 200.

As an optional component, the system 200 may comprise a display output interface or any other type of output interface (not shown) for outputting one or more determined state predictions to a rendering device, such as a display. For example, the display output interface may generate display data for the display causing the display to render the one or more predictions in a sensory perceptible manner, e.g., as an on-screen visualisation.

The determined state predictions can be used for training and/or controlling a computer-controlled system. For example, this computer-controlled system can be prediction system 200 itself, or prediction system 200 may communicate with an external computer-controlled system for training and/or controlling it, e.g., by providing a determined state prediction; or by determining and providing an interaction policy or control command based on the prediction.

For example, prediction system 200 may be a computer-controlled system for interacting with an environment, e.g., a robotics system. The prediction system 200 may comprise an actuator interface (not shown). The actuator interface may be for providing, to an actuator, actuator data causing the actuator to effect an action in the environment. For example, the actuator may be an electric, hydraulic, pneumatic, thermal, magnetic and/or mechanical actuator. Specific yet non-limiting examples include electrical motors, electroactive polymers, hydraulic cylinders, piezoelectric actuators, pneumatic actuators, servomechanisms, solenoids, stepper motors, etc. Processor subsystem 240 may be configured to determine the actuator data based on a determined prediction, e.g., in order to move a robot arm into a desired location. The actuator can be part of prediction system 200.

Prediction system 200 can also be in communication with an external computer-controlled system for training and/or controlling it. For example, prediction system 200 can be a subsystem of a vehicle, and the model can be a model of a mechanical component of the vehicle. Prediction system 200 can in this case for example provide the determined state prediction to another subsystem of the vehicle for controlling the vehicle based on the determined state prediction. Or, prediction system 200 can itself determine a control signal for controlling the vehicle based on the prediction. Many variations will be envisaged by the skilled person.

Various details and aspects of the operation of the prediction system 200 will be further elucidated with reference to FIGS. 3-4, including optional aspects thereof.

In general, the prediction system 200 may be embodied as, or in, a single device or apparatus, such as a workstation, e.g., laptop or desktop-based, or a server. For example, the prediction system 200 may be an embedded computer, such as part of a control system of the computer-controlled entity, e.g., built into an autonomous vehicle or robotic agent. The device or apparatus may comprise one or more microprocessors which execute appropriate software. For example, the processor subsystem may be embodied by a single Central Processing Unit (CPU), but also by a combination or system of such CPUs and/or other types of processing units. The software may have been downloaded and/or stored in a corresponding memory, e.g., a volatile memory such as RAM or a non-volatile memory such as Flash. Alternatively, the functional units of the system, e.g., the data interface and the processor subsystem, may be implemented in the device or apparatus in the form of programmable logic, e.g., as a Field-Programmable Gate Array (FPGA) and/or a Graphics Processing Unit (GPU). In general, each functional unit of the system may be implemented in the form of a circuit. It is noted that the prediction system 200 may also be implemented in a distributed manner, e.g., involving different devices or apparatuses, such as distributed servers, e.g., in the form of cloud computing.

FIG. 3 shows a detailed, yet non-limiting, example of a trained model for making state predictions of a computer-controlled entity and/or its environment according to an embodiment of the present invention.

Sensor data Data 305 may be obtained from a sensor, such as sensor 072, and may be used to determine the current state of the computer-controlled entity and/or its environment. The current state may be referred to as the state $x_{k0}$, or the state x at time step k0. In some embodiments, time step k0 may correspond to a time t=0. The state may be inferred from sensor data which may be obtained from one or more sensors. The sensor(s) may be part of the computer-controlled entity so as to be able to obtain sensor measurements which are associated with the state of the computer-controlled entity, or may be arranged separate from the computer-controlled entity if the sensor measurements may be obtained remotely. The sensor measurements pertain to quantities that allow the state to be inferred from the sensor measurements. As such, there exists a correlation between the measured quantity(s) and the quantity(s) representing the state to be inferred. Typically, the quantity representing the state to be inferred cannot be measured directly, e.g., for fundamental or practical reasons.

Based on the sensor data Data 305, the system 200 may derive a probability distribution PrXk 310 of the current state. In some embodiments, the probability distribution PrXk 310 is a normal distribution defined by a mean and a covariance. The covariance of an observed state (e.g., a state based on measurements and/or sensor data) may be set to an identity matrix multiplied by some small value epsilon. In other words, $P_{k0} \approx I\varepsilon$, where $\varepsilon$ is sufficiently small.

The model uses an SDE 300 in which two neural networks are used to model the drift component and the diffusion component. Specifically, a first neural network NN1 315 is used to approximate the drift component and a second neural network NN2 320 is used to approximate the diffusion component.

The distribution of the stochastic process may be approximated, for example in order to avoid the need for sampling. In order to benefit from the pleasant tractability properties and general appropriateness to data, the distribution p(x, t) of the stochastic process may be approximated by $p(x, t) \approx N(x|m(t), P(t))$.

The SDE 300 may be discretized in operation 325 to express the next state of the computer-controlled entity and/or its environment based on the current state of the computer-controlled entity and/or its environment. Preferably, an Euler-Maruyama discretization scheme may be used. The discretization of Equation (1) using the Euler-Maruyama discretization scheme is shown below:

$$x_{k+1} = x_k + f(x_k, t_k)\Delta t + L(x_k, t_k)\Delta W = EM(x_k, W_k, t_k) \qquad \text{(Equation 2)}$$

where $x_k$ represents a value or set of values (e.g., a vector) corresponding to a current state of the computer-controlled entity and/or its environment. Although the current example uses an Euler-Maruyama (EM) discretization scheme, this is merely exemplary. Other discretization schemes, such as a Milstein discretization, may similarly be used.

In other words, the SDE is discretized such that the state of the computer-controlled entity and/or its environment at a time step k+1 is based on the state of the computer-controlled entity and/or its environment at a time step k, which may be the current time step.

The use of such a discretization enables a numerically stable method of estimating the transitional probability of a neural SDE (NSDE) to be achieved. The method disclosed herein is referred to as deterministic inference for NSDEs (DI-NSDE).

Based on the EM discretization $EM(x_k, W_k, t_k)$, the mean and covariance may be approximated as shown below:

$$m_{k+1} = \iint EM(x_k, W_k, t_k) \times N(m_k, P_k) p(W_k) dW_k dx_k$$

$$P_{k+1} = \iint [EM(x_k, W_k, t_k) - m_{k+1}] \times [EM(x_k, W_k, t_k) - m_{k+1}]^T \times N$$
$$(m_k, P_k) p(W_k) dW_k dx_k \qquad \text{(Equation 3)}$$

The solution thus results in a coupled system of equations. The input $(x_k)$ and the noise process $(W_k)$ are decoupled, and so the two integrals may be evaluated separately. Using the fact that the expectation value (E) of $\Delta W$ is zero (e.g., $E[\Delta W] = 0$) and the expectation value of $\Delta W^2$ does not equal zero (e.g., $E(\Delta W^2) \neq 0$), it becomes possible to omit the values depending on $\Delta W$. This results in a simpler problem which may be approximated by linearization, such as using a Taylor expansion, or by cubature approximation, such as an unscented transform.

At each time step, it is assumed that the state of the computer-controlled entity and/or its environment at said time step may be approximated by a normal distribution defined by a mean m and a covariance P. The mean and the covariance may thus be approximated.

In some embodiments, the mean is approximated through the use of a linearized approximation method such as a first-order Taylor expansion, as shown below:

$$m_{k+1} \approx m_k + f(m_k, t_k) \Delta t \qquad \text{(Equation 4)}$$

Although in this particular example, a first-order Taylor expansion is used, this is merely exemplary. In some embodiments, a cubature approximation may similarly be used.

Cubature approximation is a method of approximating the expectation of a function $g(\bullet)$ with respect to a multivariate normal distribution $N(\bullet)$, as shown below:

$$\int g(x, t) N(x \mid m, P) dx \approx \sum_i w_i g(\chi_i, t) \qquad \text{(Equation 5)}$$

where $\chi_i = m + \sqrt{P} \zeta_i$, and $\sqrt{P}$ is the Cholesky decomposed of P such that $\sqrt{P}\sqrt{P}^T = P$. The scalars $w_i$ are the weights of the sum and the vectors $\zeta_i$ control the positioning of the evaluation points. There exist several types of cubature approximation, each of which use different choices for $w_i$ and $\zeta_i$. In the example described herein, an unscented transform (UT) may be used. For an UT, the weights and vectors are defined as follows:

$$w_i = \begin{cases} \dfrac{\lambda}{D + \kappa}, & i = 0, \\ \dfrac{1}{2(D + \kappa)}, & i = 1, \dots, 2D \end{cases} \qquad \text{(Equation 6)}$$

$$\zeta_i = \begin{cases} 0, & i = 0 \\ \sqrt{\lambda + D}\, e_i, & i = 1, \dots, D \\ -\sqrt{\lambda + D}\, e_{i-D}, & i = D+1, \dots, 2D \end{cases}$$

where D is dimensionality, and $\lambda$ and $\kappa$ are hyperparameters controlling the spread of approximation points in the D-dimensional sphere. In some embodiments, $\lambda = 0$ and $\kappa = 0$. $e_i$ represents a basis in the D-dimensional sphere, and may be selected to be a unit vector in Cartesian space. The UT may be considered a third order cubature method, meaning that it uses three approximation points per dimension. Higher order cubature approximations may similarly be derived at the expense of more function evaluations.

By first discretizing the SDE, however, it is possible to integrate out the noise component W, which means that the covariance P may be solved by a cubature approximation as shown in Equation 7 below, e.g., a cubature approximation of Equation 5 in which $[x_k + f(x_k, t_k) \Delta t - m_{k+1}] \times [x_k + f(x_k, t_k) \Delta t - m_{k+1}]^T + LL^T(x_k, t_k) = g(x, t)$:

$$P_{k+1} = \int [x_k + f(x_k, t_k) \Delta t - m_{k+1}] \times [x_k + f(x_k, t_k) \Delta t - m_{k+1}]^T + LL^T$$
$$(x_k, t_k) \Delta t N(m_k, P_k) dx_k \qquad \text{(Equation 7)}$$

As illustrated in Equation 7, the covariance for state $x_{k+1}$ is dependent on the covariance of the current state, $P_k$, and on the mean of the next state, $m_{k+1}$. In other words, the mean and covariance of the next state form a coupled system.

Based on the discretization of the SDE 300, a mean function MF 330 and a covariance function CvF 335 for calculating the mean and covariance of the next state $x_{k+1}$ based on the current state $x_k$ may be determined as shown in Equations 3 and 4.

The probability distribution PrXk 310 may be used to obtain the values of the current mean $m_k$ and the current covariance $P_k$. As will be demonstrated in greater detail below, the terms "current mean" and "current covariance" refer to the mean and the covariance of the state currently measured or being the basis for the prediction of the "next" state. In the first instance, the current state refers to the state for which sensor data is provided or obtained, in other words, the state of the computer-controlled entity and/or its environment in the present. However, in some embodiments, multiple future states are predicted, and a state two time steps ahead may be predicted based on the predicted state one time step ahead. In other words, state $x_{k+2}$ may be predicted using the predicted state $x_{k+1}$. In such a case, the current state may be $x_{k+1}$ and the next state may be $x_{k+2}$. That is, the current state refers to the state being used in the prediction of the next state.

The mean $m_k$ and the covariance $P_k$, provided by the probability distribution PrXk 310, may be provided as inputs to the mean function MF 330 and the covariance function CvF 335, respectively. The mean function MF 330 calculates the mean of the next state, $m_{k+1}$ based on the received current mean $m_k$, the first neural network NN1 315 and the second neural network NN2 320. The covariance function CvF 335 receives as input the current covariance $P_k$ and the calculated mean of the next state, $m_{k+1}$ and estimates the covariance of the next state, $P_{k+1}$.

The estimated mean $m_{k+1}$ and covariance $P_{k+1}$ for the next state may be used to define a transition probability PrXk+1 340 for the next state of the computer-controlled entity and/or its environment. In some embodiments, the transition probability PrXk+1 340 may be a normal distribution.

The next state $x_{k+1}$ may then be predicted, for example, by sampling Sk+1 345 from the transition probability PrXk+1 340, or by merely using the predicted mean value. Optionally, control data CD 350 may be generated based on the predicted state $x_{k+1}$. Control data CD 350 may be used to control or adjust an aspect of the computer-controlled entity and/or its environment. For example, control data CD 350 may be used to control an actuator within the computer-controlled entity or within its environment.

In some embodiments of the present invention, a state several time steps in the future may be predicted. In such embodiments, the prediction process may iterate over the loop 360 indicated in FIG. 3 by the dashed box. For example, the value of k may increment, as shown in box 355, and the transition probability of the next state PrXk+1 340 may be used as the probability distribution for the current state PrXk 310. Equivalently, the mean of the next state $m_{k+1}$ and the covariance of the next state $P_{k+1}$ may be used as the inputs to the mean function MF 330 and the covariance function CvF 335 respectively, to estimate a mean and a covariance for a subsequent state. The loop 360 may be repeated for a predetermined number of iterations, or until an uncertainty exceeds a threshold level. The uncertainty of a prediction may be obtained from the covariance, which provides an estimate of the spread of the data. For example, a high covariance implies a large spread, meaning a high uncertainty. The off-diagonal values of the covariance provide information on the direction of the spread.

Pseudocode for the above method is provided in Algorithm 1, shown below. The algorithm accepts as input an initial time $t_0$, an initial distribution $m_0$ and $P_0$, a time interval $\Delta t$, a number of time steps K, the first neural network NN1 315 (expressed in the pseudocode as f(•)) and the second neural network NN2 320 (expressed in the pseudocode as L(•)). The algorithm outputs the values of time t at each time step (e.g., from 0 to K), the calculated means m for each time step (e.g., from 0 to K) and the calculated covariances P for each time step (e.g., from 0 to K). Hyperparameters $\lambda$ and $\kappa$ may be used to place the points, for example, how close to the mean and how much relevance to assign to the mean.

---

Algorithm 1 DI-NSDE with linearized mean.

---

Inputs: $t_0$, $m_0$, $P_0$, $\Delta t$, K, f (·), L (·)
Outputs: $t_{0:K}$, $M_{0:K}$, $P_{0:K}$
Hyperparameters: $\lambda$, $\kappa$ $$\omega_0 = \frac{\lambda}{D+\kappa}, \zeta_0 = 0$$

for i ← 1 : 2D do $$\omega_i = \frac{1}{2(D+\kappa)}$$

if i <= D then
   $\zeta_i = \sqrt{\lambda + D}e_i$
else
   $\zeta_i = -\sqrt{\lambda + D}e_{i-D}$
end if
end for
for k ← 0 : K – 1 do
  $t_{k+1} = t_k + \Delta t$
  $m_{k+1} = m_k + f(m_k, t_k)\Delta t$
  $\chi_{k,i} = m_k + \sqrt{P_k}\zeta_i$ $$P_{k+1} = \sum_{i=0}^{2D} \{[\chi_{k,i} + f(\chi_{k,i}, t_k)\Delta t - m_{k+1}] \times$$

$$[\chi_{k,i} + f(\chi_{k,i}, t_k)\Delta t - m_{k+1}]^T + LL^T(\chi_{k,i}, t_k)\Delta t\}\omega_i$$

end for
Return: $t_{0:K}$, $M_{0:K}$, $P_{0:K}$

---

FIG. 4 shows a detailed example of training a machine learnable model based on observations according to an example embodiment of the present invention.

The method illustrated in FIG. 4 may be used to train the first neural network NN1 315 and the second neural network NN2 320 of FIG. 3. To avoid confusion, however, the first neural network to be trained will be referred to as NN1' 415 and the second neural network to be trained will be referred to as NN2' 420 herein.

Training the neural networks NN1' 415 and NN2' 420 comprises determining a set of weights Wts $\theta$ 410 for said neural networks. The set of weights Wts $\theta$ 410 may be expressed as comprising two sets of weights, e.g., $\theta=\{\theta_1, \theta_2\}$ where $\theta_1$ represents the weights for the first neural network NN1' 415 and $\theta_2$ represents the weights for the second neural network NN2' 420.

This may comprise optimizing the weights Wts $\theta$ 410 using a maximum likelihood estimation MLE 435. The maximum likelihood estimation MLE 435 determines a set of weights Wts $\theta$ 410 which maximizes the probability of the observations Obs 405 given the weights Wts $\theta$ 410:

$$\theta_{MLE} = \underset{\theta}{\arg\max} \log p(Obs \mid \theta) = \underset{\theta}{\arg\max} \sum_{n=1}^{N} \log p(x_{n+1} \mid x_n, \theta) \qquad \text{(Equation 9)}$$

A set of observations Obs 405 may be provided to the machine learnable model. Each observation in the set of observations Obs 405 comprises a time component $t_n$ and corresponding variable $x_n$ indicating a state of the physical process at time $t_n$. The variable $x_n$ may also be referred to as state data. A set of N observations may be expressed as Obs=$\{x_n, t_n\}_{n=1 \ldots N}$. The state data $x_n$ may be a scalar or a vector. Moreover, the state data $x_n$ may represent a state of the computer-controlled entity and/or its environment directly, or may represent data from which the state of the computer-controlled entity and/or its environment may be determined. For example, the state data $x_n$ may comprise sensor data previously obtained. The observations need not have regular time intervals. For example, a first observation may correspond to a state at a first time value, the second observation may correspond to a state measured five seconds later, and the third observation may correspond to a state measured 3 minutes after the second observation was made. That is, the observations may be arbitrarily spaced. In some embodiments, however, the observations do correspond to regular time intervals. From the set of observations Obs 405, a first observation $(x_1, t_1)$ is provided to the loop LOOP 360, which is described in detail with reference to FIG. 3.

The equations used in LOOP 360 use the neural networks NN1' 415 and NN2' 420 as universal function approximators for the drift function f(•) and the diffusion function L(•), respectively. The same discretization method 325 is used therein as described with reference to FIG. 3. LOOP 360 outputs a predicted transition probability distribution PrD_Xn+1 425 for the next state $x_2$. The probability PrXn+1 430 of the observed next state, e.g., the observed value of $x_2$, is then obtained from the probability distribution. For example, based on the value of $x_1$, LOOP 360 outputs a probability distribution PrD_Xn+1 425, e.g., a transition probability distribution, of $x_2$, which can be expressed as $p(x_2|x_1, \theta)$. Assume in this example that the value of $x_2$ given in the set of observations Obs 405 is some value a, the probability of a can be obtained from the transition probability distribution PrD_Xn+1 425, as p(a). Thus, when the predicted distribution of $x_2$ closely corresponds to the value of $x_2$ in the set of observations Obs 405, the probability value is high, and when the predicted distribution does not correspond to the value of $x_2$ in the set of observations Obs 405, the probability value is low.

This process may be repeated for each observation in the set of observations Obs 405. For example, either sequentially or simultaneously, the value of $x_2$ may be provided to LOOP 360, in order to obtain a transition probability distribution PrD_Xn+1 425 of $x_3$. The transition probability PrXn+1 430 corresponding to the actual value of $x_3$, e.g., from the set of observables Obs 405, may then be obtained from the transition probability distribution PrD_Xn+1 430. Thus, each summed term in the maximum likelihood equation (Equation 10) comprises determining the probability of the next state $(x_{n+1})$ given by a generated (e.g., predicted) transition probability distribution for a next state $(x_{n+1})$ given an input state $(x_n)$. Based on this equation, the maximum likelihood estimation MLE 435 optimizes the values of the weights Wts $\theta$ 410 such that the probability of obtaining the measured next state, summed over the observations, is maximized.

In some embodiments, it is desirable to perform a set or chain of predictions. For example, the method described above may be modified such that, after obtaining a first probability distribution PrD_Xn+1 425 of a state $x_{n+1}$, the predicted mean and covariance values are input into the mean function MF 330 and the covariance function CvF 335 in order to calculate the subsequent mean and covariance, $m_{n+2}$ and $P_{n+2}$. This may be repeated to obtain a transition probability distribution for a state multiple time steps ahead of the input state. For example, an input state $x_1$ may be input into the LOOP 360. The mean function MF 330 and the covariance function CvF 335 may be iterated R times, e.g., over R time steps, in each iteration using the previously calculated mean and covariance, and after R iterations, a transition probability distribution for predicted state $x_{1+R}$ is output. From this transition probability distribution, the probability of the observed or measured value of $x_{1+R}$, e.g., from the set of observables Obs 405, may be obtained. In other examples, the same modification may be performed by using smaller time steps. For example, if the time steps in the set of observables Obs 405 are separated by 1 minute increments, additional sub-steps may be used in the iterative part of the loop 360. For example, a new mean and covariance may be calculated for every 10 second time step, and after 1 minute, the probability of the state data of the next observable is obtained from the generated transition probability distribution. The use of such chains of predictions may be particularly beneficial in improving training stability.

Figure 5:
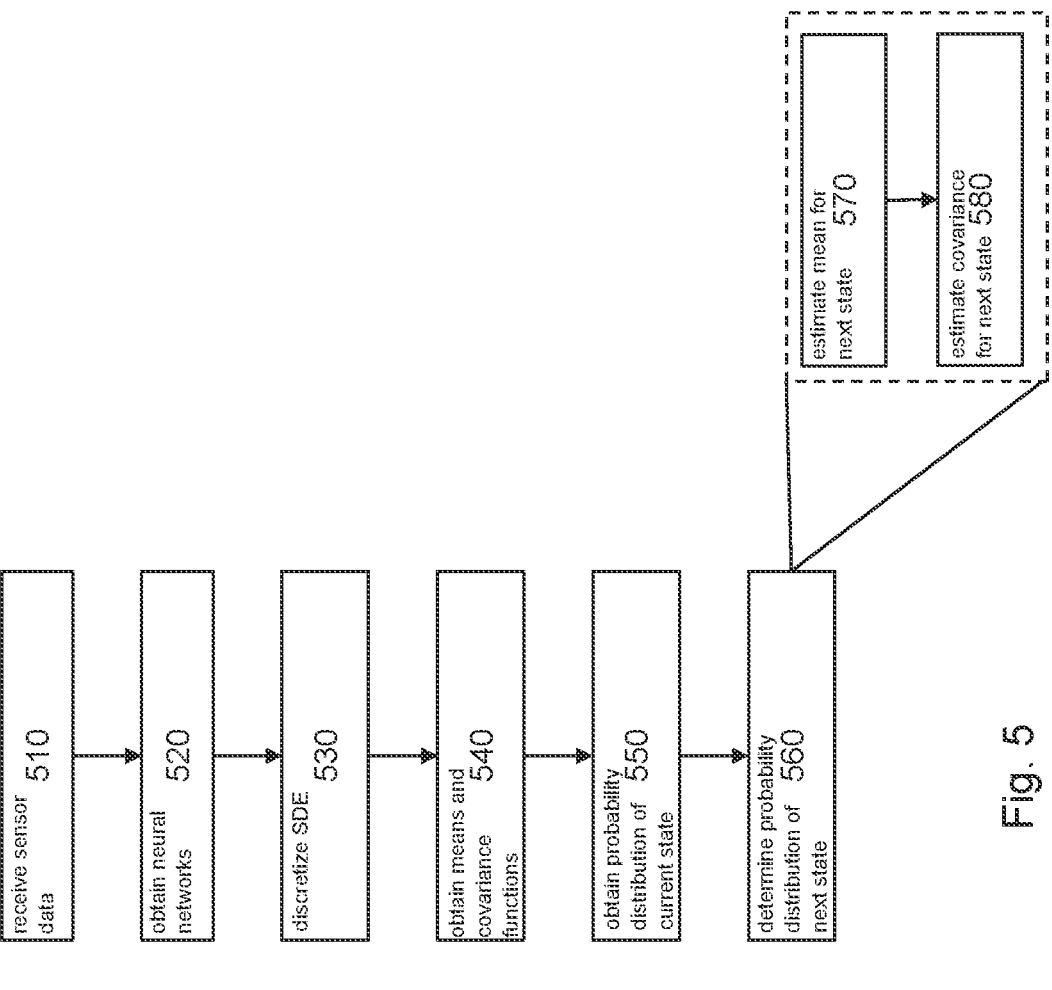
FIG. 5 shows a computer-implemented method of using a trained model to make a state prediction of a computer-controlled entity and/or its environment according to an example embodiment of the present invention.

FIG. 5 shows a block diagram of a computer-implemented method 500 of using a trained model to make a state prediction of a computer-controlled entity and/or its environment according to an example embodiment of the present invention. The physical process of the computer-controlled entity and/or its environment may use a stochastic differential equation (SDE), comprising a drift component and a diffusion component. The method 500 may correspond to an operation of the prediction system 200 of FIG. 2. However, this is not a limitation, in that the method 500 may also be performed using another system, apparatus or device.

The method 500 may comprise, in an operation entitled "RECEIVE SENSOR DATA", receiving 510 sensor data, such as from a sensor or plurality of sensors. The sensor(s) may be comprised within the system or may be coupled thereto. The sensor data may be used to determine a state of the computer-controlled entity and/or its environment.

The method 500 may comprise, in an operation entitled "OBTAIN NEURAL NETWORKS", obtaining or accessing 520 a first neural network used to approximate the drift component and a second neural network used to approximate the diffusion component. The first and second neural networks may be trained as described with reference to FIG. 4, and may thus include the optimized weights calculated therein.

The method 500 may comprise, in an operation entitled "DISCRETIZE SDE", discretizing 530 the SDE into time steps, for example by using the Euler-Maruyama discretization scheme or the Milstein discretization.

The method 500 may comprise, in an operation entitled "OBTAIN MEAN AND COVARIANCE FUNCTIONS", obtaining 540 a time-evolving mean function and a time-evolving covariance function. The time-evolving mean function may be obtained using the discretized SDE and an approximation, such as a linearization or a cubature approximation, as described with reference to FIG. 3. The time-evolving covariance function may similarly be obtained using the discretized SDE and an approximation, preferably a cubature approximation such as the unscented transform. Suitable alternative approximations include sampling, Taylor expansion, or adaptive cubature approximation methods.

The method 500 may comprise, in an operation entitled "OBTAIN PROBABILITY DISTRIBUTION OF CURRENT STATE", obtaining or generating 550 a probability distribution for the current state. The probability distribution may be a normal distribution, in which the mean is set to the measured or determined value of the current state. The covariance may be set to be small, such as the identity matrix scaled by a sufficiently small value of $\varepsilon$. The covariance may relate to the width or spread of the probability distribution, and may be set based on a measurement uncertainty or a degree of precision, for example.

The method 500 may comprise, in an operation entitled "DETERMINE PROBABILITY DISTRIBUTION OF NEXT STATE", determining 560 a transition probability distribution of the next state, given the current state.

Determining 560 the transition probability of the next state may comprise, in a sub-operation entitled "ESTIMATE MEAN FOR NEXT STATE", estimating 570 the mean for the next state using the mean of the probability distribution for the current state as an input to the time-evolving mean function obtained in operation 540.

Determining 560 the transition probability of the next state may comprise, in a sub-operation entitled "ESTIMATE COVARIANCE FOR NEXT STATE", estimating 580 the covariance of the next state using the covariance of the probability distribution for the current state and the mean calculated for the next state as inputs to the time-evolving covariance function obtained in operation 540.

Although not depicted in FIG. 5, the method 500 may further comprise sampling from the probability distribution defined by the mean and covariance estimated in operations 570 and 580, respectively. The sampled value may then be used as a prediction for the next state, and the covariance of the transition probability distribution may be used to obtain an uncertainty of the prediction.

It should be noted that the order depicted in FIG. 5 is not a required ordering, and it is possible for the operations described therein to be performed simultaneously or in a different sequence. For example, operations 510 and 520 may be performed simultaneously, or operation 520 may be performed before operation 510. Additionally, the discretizing operation 530 and the obtaining of the mean and covariance functions 540 may be performed ahead of time. In particular, the discretizing operation 530 may be performed once, for example in a first use of the method 500, and the time-evolving mean and covariance functions may be obtained from local and/or external memory in operation

540. Additionally, operations 550 and 560 may be repeated one or more times in order to obtain a series of predictions for future states.

Figure 6:
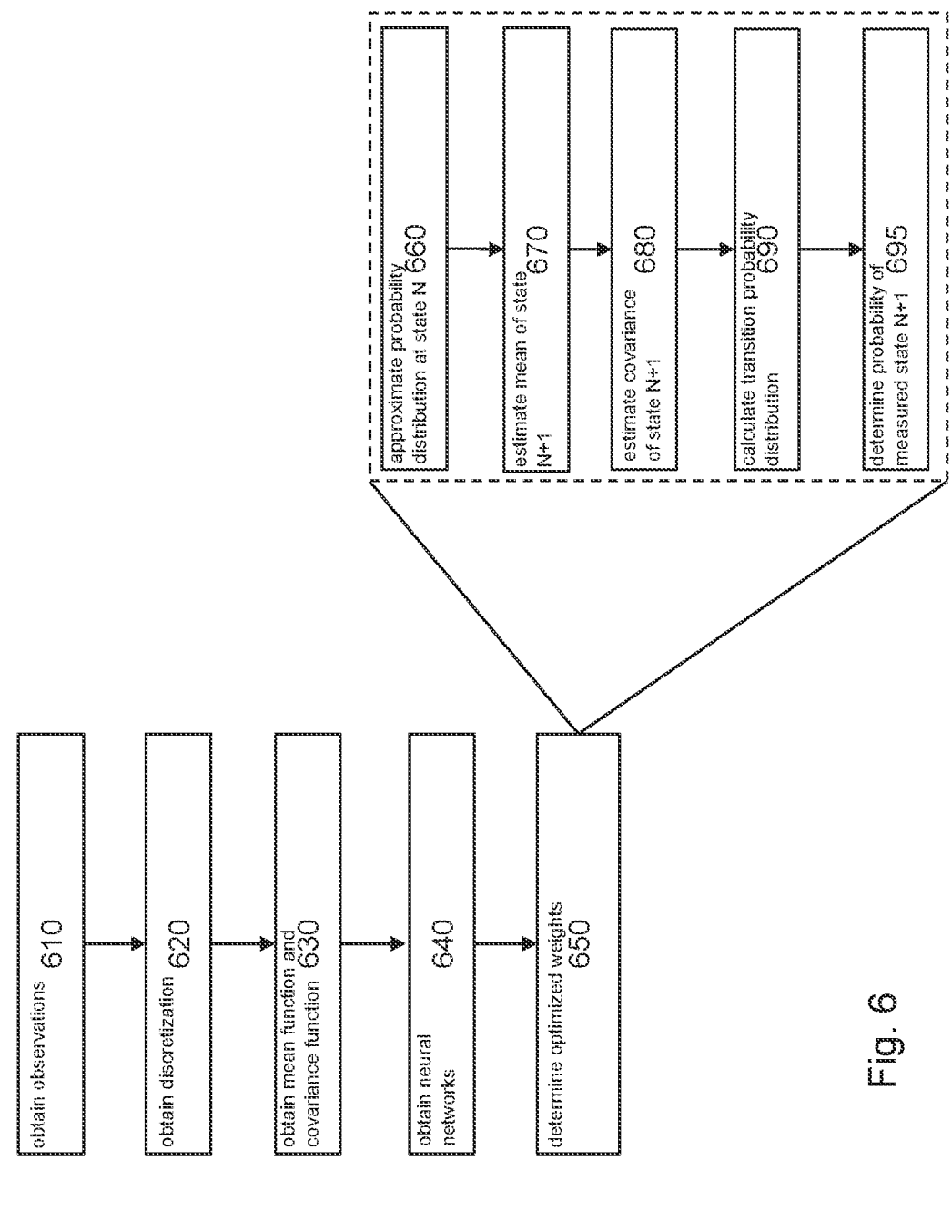
FIG. 6 shows a computer-implemented method of training a model for making state predictions of a computer-controlled entity and/or its environment according to an example embodiment of the present invention.

FIG. 6 shows a block diagram of computer-implemented method 600 of training a model, e.g., a machine-learnable system, for making state predictions of a computer-controlled entity and/or its environment according to an embodiment of the present invention. The model may use a stochastic differential equation (SDE) comprising a drift component and a diffusion component. The method 600 may correspond to an operation of the training system 100 of FIG. 1. However, this is not a limitation, in that the method 600 may also be performed using another system, apparatus or device.

The method 600 may comprise, in an operation entitled "OBTAIN OBSERVATIONS", obtaining 610 a set of N observations. The observations may comprise previously measured state information. Each observation in the set of observations may comprise state data $x_n$ and a time value $t_n$. The state data $x_n$, also referred to as a variable indicating a state of the computer-controlled entity and/or its environment at a time step n, may be a scalar value or a vector, such as a set of values or measurements.

The method 600 may comprise, in an operation entitled "OBTAIN DISCRETIZATION", obtaining 620 a discretization of the SDE into time steps, for example by using the Euler-Maruyama discretization scheme or the Milstein discretization.

The method 600 may comprise, in an operation entitled "OBTAIN MEAN FUNCTION AND COVARIANCE FUNCTION", obtaining 630 a time-evolving mean function and a time-evolving covariance function. The time-evolving mean function may be obtained using the discretized SDE and an approximation, such as a linearization or a cubature approximation, as described with reference to FIG. 3. The time-evolving covariance function may similarly be obtained using the discretized SDE and an approximation, preferably a cubature approximation such as the unscented transform.

The method 600 may comprise, in an operation entitled "OBTAIN NEURAL NETWORKS", obtaining 640 a first neural network for approximating the drift component, a second neural network for approximating the diffusion component, and an initial set of weights θ. The initial set of weights may comprise two subsets of weights, $θ_1$ and $θ_2$. The first subset $θ_1$ may comprise weights of the first neural network and the second subset $θ_2$ may comprise weights of the second neural network.

The method 600 may comprise, in an operation entitled "DETERMINE OPTIMIZED WEIGHTS", determining 650 weights according to a maximum likelihood estimation in which the probability of the observations given the weights is maximized. For each observation in the set of observations, a transition probability distribution of a subsequent state is determined and the probability of the subsequent observed state is obtained from the transition probability distribution, as follows.

Determining 650 the weights may comprise, in an operation entitled "APPROXIMATE PROBABILITY DISTRIBUTION AT STATE N", approximating 660 a probability distribution of a state from the set of observations, for example state $x_1$ from the set of observations. For example, the value of the state $x_1$ may be used as a mean of a normal distribution. The covariance may be based on an uncertainty or may be set to some initial value or estimation, for example a scaled identity matrix of appropriate dimensions.

Determining 650 the weights may comprise, in an operation entitled "ESTIMATE MEAN OF STATE N+1", estimating 670 a mean of the subsequent state, $x_{n+1}$. The mean of the next state $x_{n+1}$ may be determined using the obtained time-evolving mean function from the mean of state $x_n$.

Determining 650 the weights may comprise, in an operation entitled "ESTIMATE COVARIANCE OF STATE N+1", estimating 680 a covariance of the subsequent state, $x_{n+1}$. The covariance of the next state $x_{n+1}$ may be determined using the obtained time-evolving covariance function, using the covariance of state $x_n$ and the mean of the subsequent state $x_{n+1}$.

Determining 650 the weights may comprise, in an operation entitled "CALCULATE TRANSITION PROBABILITY DISTRIBUTION", calculating 690 a transition probability distribution of the subsequent state $x_{n+1}$. The transition probability distribution may be, for example, a normal distribution defined by the mean estimated in operation 670 and the covariance estimated in operation 680.

Determining 650 the weights may comprise, in an operation entitled "DETERMINE PROBABILTIY OF MEASURED STATE N+1", determining 695 the probability of the state $x_{n+1}$ provided by a subsequent observation in the set of observations, based on the calculated transition probability distribution.

It will be appreciated that, in general, the operations of method 500 of FIG. 5 and method 600 of FIG. 6 may be performed in any suitable order, e.g., consecutively, simultaneously, or a combination thereof, subject to, where applicable, a particular order being necessitated, e.g., by input/output relations. Some or all of the methods may also be combined, e.g., method 600 of applying a trained model may be applied subsequently to this trained model being trained according to method 500.

Figure 7:
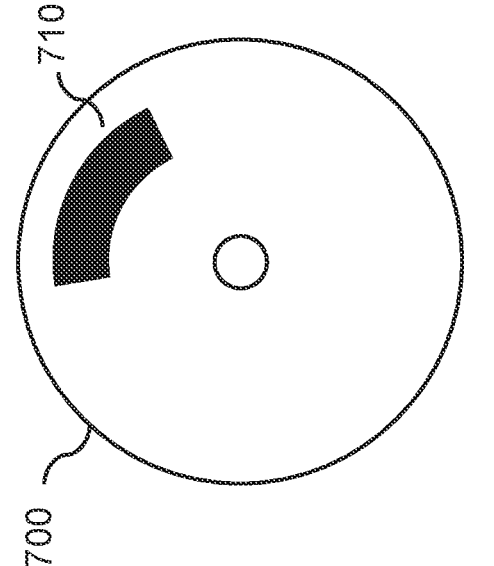
FIG. 7 shows a computer-readable medium comprising data, in accordance with an example embodiment of the present invention.

The method(s) may be implemented on a computer as a computer-implemented method, as dedicated hardware, or as a combination of both. As also illustrated in FIG. 7, instructions for the computer, e.g., executable code, may be stored on a computer readable medium 700, e.g., in the form of a series 710 of machine-readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 7 shows an optical disc 700.

Examples, embodiments or optional features, whether indicated as non-limiting or not, are not to be understood as limiting the present invention.

It should be noted that the above-mentioned embodiments illustrate rather than limit the present invention, and that those skilled in the art will be able to design many alternative embodiments.

Use of the verb "comprise" and its conjugations does not exclude the presence of elements or steps other than those stated. The article "a" or "an" preceding an element does not exclude the presence of a plurality of such elements. Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The present invention may be implemented by means of hardware comprising several distinct elements, and by means of a suitably programmed computer. In a device enumerating several means, several of these means may be embodied by one and the same item of hardware. The mere fact that certain measures are described separately does not indicate that a combination of these measures cannot be used to advantage.

What is claimed is:

1. A computer-implemented method for enabling control or monitoring of a computer-controlled entity operating in an environment by predicting a future state of the computer-controlled entity or the environment using sensor data which is indicative of a current state of the computer-controlled entity or the environment, the method comprising:

receiving the sensor data indicative of the current state of the computer-controlled entity or the environment;

accessing a first trained neural network for approximating a drift component of a stochastic differential equation and a second trained neural network for approximating a diffusion component of the stochastic differential equation;

discretizing the stochastic differential equation into time steps, wherein the discretized stochastic differential equation defines a second state of the computer-controlled entity or the environment as being dependent on the current state of the computer-controlled entity or the environment and a time interval between a time step k of the current state and a time step k+1 of the second state;

obtaining a time-evolving mean function and a time-evolving covariance function based on the discretization, wherein at any time t, a state of the computer-controlled entity or the environment is expressed as a distribution defined by a mean at the time t and a covariance at the time t;

obtaining a probability distribution of the current state of the computer-controlled entity or the environment, the probability distribution being defined by a current mean and a current covariance;

determining a transition probability distribution of the second state of the computer-controlled entity or the environment by:

estimating a mean for the second state by expanding the time-evolving mean function, using the current mean, estimating a covariance for the second state using the estimated mean for the second state and the current covariance;

sampling from the determined transition probability distribution to obtain a prediction for the second state, wherein the computer-controlled entity includes a vehicle, a robot, a drone, a power tool, or a manufacturing machine, wherein an uncertainty of the prediction for the second state is determined based on the covariance for the second state;

generating control data based on the prediction for the second state and the uncertainty; and controlling a physical action of the vehicle, the robot, the drone, the power tool, or the manufacturing machine by supplying the control data to an actuator of the vehicle, the robot, the drone, the power tool, or the manufacturing machine.

2. The method of claim 1, wherein the discretization of the stochastic differential equation is an Euler-Maruyama discretization.

3. The method of claim 1, wherein estimating the mean for the second state includes one of:

expanding the time-evolving mean function using a linear expansion; or using a cubature approximation.

4. The method of claim 3, wherein the linear expansion is a first-order Taylor expansion.

5. The method of claim 1, wherein estimating the covariance for the second state includes using a cubature approximation.

6. The method of claim 1, further comprising:

outputting the mean of the determined transition probability distribution as the prediction and outputting the covariance of the determined transition probability distribution as a confidence value for the prediction.

7. The method of claim 1, wherein the current mean is initialized as a measurement value of the current state and the current covariance is initialized as the identity matrix scaled by an arbitrarily small positive value.

8. The method of claim 1, further comprising sequentially approximating at least one further state of the computer-controlled entity or the environment based on a prediction of an immediately preceding state, by iteratively:

selecting a new state of the at least one further state to be a state immediately following a last predicted state, estimating a mean for the new state using a mean determined for the last predicted state, estimating a covariance for the new state using the estimated mean for the new state and a covariance determined for the last predicted state, and determining a transition probability distribution of the new state using the estimated mean for the new state and the estimated covariance for the new state.

9. A computer-implemented method for training a machine learnable model for use in controlling or monitoring a computer-controlled entity in an environment, wherein the machine learnable model is trained to predict a future state of the computer-controlled entity or the environment based on sensor data which is indicative of a current state of the computer-controlled entity or the environment, the machine learnable model including a first neural network for approximating a drift component of a stochastic differential equation and a second neural network for approximating a diffusion component of the stochastic differential equation, the method comprising:

obtaining a set of N observations, each observation comprising a time step and a variable indicating a state of the computer-controlled entity or the environment at the time step;

obtaining a discretization of the stochastic differential equation;

obtaining a time-evolving mean function and a time-evolving covariance function based on the discretization of the stochastic differential equation;

obtaining the first neural network, the second neural network and a set of weights for each of the first neural network and the second neural network;

determining an optimized set of weights for each of the first neural network and the second neural network using maximum likelihood estimation to maximize a probability of the set of N observations given the set of weights, wherein the maximum likelihood estimation includes iteratively performing:

approximating a probability distribution of the variable corresponding to the state of the computer-controlled entity or the environment at each time step n of the set of N observations;

for each time step n:

estimating a mean for a time step n+1 using a mean for the time step n;

estimating a covariance for the time step n+1 using the mean for the time step n+1 and a covariance estimated for the time step n;

calculating a transition probability distribution of the variable corresponding to the state at the time step n+1 based on the estimated mean for the time step n+1 and the estimated covariance for the time step n+1; and determining a probability of the variable corresponding to the state at the time step n+1 from the set of N observations according to the calculated transition probability distribution, wherein the calculated transition probability distribution is configured to be sampled to obtain a prediction for the state of the computer-controlled entity at the time step n+1, wherein an uncertainty of the prediction is determined based on the covariance for the time step n+1;

providing a controller that is configured to generate control data based on the prediction for the state of the computer-controlled entity at the time step n+1 and the uncertainty, wherein the computer-controlled entity includes a vehicle, a robot, a drone, a power tool, or a manufacturing machine; and providing an actuator of the vehicle, the robot, the drone, the power tool, or the manufacturing machine that is configured to control, based on the control data, a physical action of the vehicle, the robot, the drone, the power tool, or the manufacturing machine.

10. The method of claim 9, wherein the discretization of the stochastic differential equation is an Euler-Maruyama discretization.

11. The method of claim 9 wherein estimating the mean for the time step n+1 includes one of:

applying a linear expansion to the time-evolving mean function, the linear expansion being a first-order Taylor expansion; and using a cubature approximation;

wherein estimating the covariance for the time step n+1 comprises using the cubature approximation.

12. A non-transitory computer-readable medium on which is stored data representing instructions for enabling control or monitoring of a computer-controlled entity operating in an environment by predicting a future state of the computer-controlled entity or the environment using sensor data which is indicative of a current state of the computer-controlled entity or the environment, the instruction, when executed by a computer, causing the computer to perform:

receiving the sensor data indicative of the current state of the computer-controlled entity or the environment;

accessing a first trained neural network for approximating a drift component of a stochastic differential equation and a second trained neural network for approximating a diffusion component of the stochastic differential equation;

discretizing the stochastic differential equation into time steps, wherein the discretized stochastic differential equation defines a second state of the computer-controlled entity or the environment as being dependent on the current state of the computer-controlled entity or the environment and a time interval between a time step k of the current state and a time step k+1 of the second state;

obtaining a time-evolving mean function and a time-evolving covariance function based on the discretization, wherein at any time t, a state of the computer-controlled entity or the environment is expressed as a distribution defined by a mean at the time t and a covariance at the time t;

obtaining a probability distribution of the current state of the computer-controlled entity or the environment, the probability distribution being defined by a current mean and a current covariance;

determining a transition probability distribution of the second state of the computer-controlled entity or the environment by:

estimating a mean for the second state by expanding the time-evolving mean function, using the current mean, estimating a covariance for the second state using the estimated mean for the second state and the current covariance;

sampling from the determined transition probability distribution to obtain a prediction for the second state, wherein the computer-controlled entity includes a vehicle, a robot, a drone, a power tool, or a manufacturing machine, wherein an uncertainty of the prediction for the second state is determined based on the covariance for the second state;

generating control data based on the prediction for the second state and the uncertainty; and controlling a physical action of the vehicle, the robot, the drone, the power tool, or the manufacturing machine by supplying the control data to an actuator of the vehicle, the robot, the drone, the power tool, or the manufacturing machine.

13. A prediction system for enabling control or monitoring of a computer-controlled entity operating in an environment by predicting a future state of the computer-controlled entity or the environment using sensor data which is indicative of a current state of the computer-controlled entity or the environment, the prediction system comprising:

a data interface configured to:

receive the sensor data indicative of the current state of the computer-controlled entity or the environment; and access a first trained neural network for approximating a drift component of a stochastic differential equation and a second trained neural network for approximating a diffusion component of the stochastic differential equation;

a processor subsystem configured to:

discretize the stochastic differential equation into time steps, wherein the discretized stochastic differential equation defines a second state of the computer controlled entity or the environment as being dependent on the current state of the computer-controlled entity or the environment and a time interval between a time step k of the current state and a time step k+1 of the second state;

obtain a time-evolving mean function and a time-evolving covariance function based on the discretization, wherein at any time t, a state of the computer-controlled entity or the environment is expressed as a distribution defined by a mean at the time t and a covariance at the time t;

obtain a probability distribution of the current state of the computer-controlled entity or the environment, the probability distribution being defined by a current mean and a current covariance;

determine a transition probability distribution of the second state of the computer-controlled entity or the environment by:

estimating a mean for the second state by expanding the time-evolving mean function, using the current mean, estimating a covariance for the second state using the estimated mean for the second state and the current covariance;

sampling from the determined transition probability distribution to obtain a prediction for the second state, wherein the computer-controlled entity includes a vehicle, a robot, a drone, a power tool, or a manufacturing machine, wherein an uncertainty of the prediction for the second state is determined based on the covariance for the second state;

generating control data based on the prediction for the second state and the uncertainty; and controlling a physical action of the vehicle, the robot, the drone, the power tool, or the manufacturing machine by supplying the control data to an actuator of the vehicle, the robot, the drone, the power tool, or the manufacturing machine.

14. A training system for training a machine-learnable model to predict a future state of a computer-controlled entity or an environment, wherein the machine-learnable model is trained to predict a future state of the computer-controlled entity or the environment based on sensor data which is indicative of a current state of the computer-controlled entity or the environment, the machine-learnable model including a first neural network for approximating a drift component of a stochastic differential equation and a second neural network for approximating a diffusion component of the stochastic differential equation, the training system comprising:

a data interface configured to:

obtain a set of N observations, each observation comprising a time step and a variable indicating a state of the computer-controlled entity or the environment at the time step;

obtain a set of weights for each of the first neural network and the second neural network; and a processor subsystem configured to:

obtain a discretization of the stochastic differential equation;

obtain a time-evolving mean function and a time-evolving covariance function based on the discretization of the stochastic differential equation;

determine an optimal set of weights for each of the first neural network and the second neural network using maximum likelihood estimation to maximize a probability of the set of N observations given the set of weights, wherein the maximum likelihood estimation includes iteratively performing:

defining a probability distribution of the variable corresponding to the state of the computer-controlled entity or the environment at each time step n of the set of N observations;

for each time step n:

estimating a mean for a time step n+1 using a mean for the time step n;

estimating a covariance for the time step n+1 using the mean for the time step n+1 and a covariance estimated for the time step n;

calculating a transition probability distribution of the variable corresponding to the state at the time step n+1 based on the estimated mean for the time step n+1 and the estimated covariance for the time step n+1; and determining a probability of the variable corresponding to the state at the time step n+1 from the set of N observations according to the calculated transition probability distribution, wherein the calculated transition probability distribution is configured to be sampled to obtain a prediction for the state of the computer-controlled entity at the time step n+1 in order for control data to be generated based on the prediction for the state of the computer-controlled entity at the time step n+1, wherein an uncertainty of the prediction is determined based on the covariance for the time step n+1, and wherein the control data is further based on the uncertainty, wherein the computer-controlled entity includes a vehicle, a robot, a drone, a power tool, or a manufacturing machine, and wherein an actuator of the vehicle, the robot, the drone, the power tool, or the manufacturing machine is configured to control, based on the control data, a physical action of the vehicle, the robot, the drone, the power tool, or the manufacturing machine.

* * * * *